United States Patent
Barton

(10) Patent No.: US 6,172,479 B1
(45) Date of Patent: Jan. 9, 2001

(54) BATTERY CONTROL CIRCUIT

(75) Inventor: Russell C. Barton, Carlsbad, CA (US)

(73) Assignee: Baxter International Inc., Deerfield, IL (US)

( * ) Notice: Under 35 U.S.C. 154(b), the term of this patent shall be extended for 0 days.

(21) Appl. No.: 09/264,206

(22) Filed: Mar. 4, 1999

(51) Int. Cl.[7] ................................................. H01M 10/46
(52) U.S. Cl. ........................................... 320/121; 320/132
(58) Field of Search ..................................... 320/116, 117, 320/120, 121, 122, 132; 307/43, 44, 46, 64, 65, 66

(56) References Cited

U.S. PATENT DOCUMENTS

| | | | |
|---|---|---|---|
| 3,997,830 | 12/1976 | Newell et al. | 320/5 |
| 4,061,955 | 12/1977 | Thomas et al. | 320/6 |
| 4,297,629 | 10/1981 | Godard et al. | 320/7 |
| 4,314,008 | 2/1982 | Blake | 429/8 |
| 4,622,508 | 11/1986 | Matteau et al. | 320/13 |
| 5,321,392 | 6/1994 | Skakoon et al. | 340/636 |
| 5,488,282 | 1/1996 | Hayden et al. | 320/14 |
| 5,528,148 | 6/1996 | Rogers | 324/426 |
| 5,592,067 | 1/1997 | Peter et al. | 320/15 |
| 5,631,534 | 5/1997 | Lewis | 320/6 |
| 5,644,208 | 7/1997 | Abiven | 320/6 |
| 5,648,713 | 7/1997 | Mangez | 320/6 |
| 5,652,501 | 7/1997 | McClure et al. | 320/17 |
| 5,677,613 | 10/1997 | Perelle | 320/6 |
| 5,712,795 | 1/1998 | Layman et al. | 364/472 |
| 5,734,253 | 3/1998 | Brake et al. | 320/6 |
| 5,739,669 | 4/1998 | Brulhardt et al. | 320/6 |
| 5,742,150 | 4/1998 | Khuwatsamrit | 320/116 |
| 5,744,936 * | 4/1998 | Kawakami | 320/122 X |
| 5,747,964 | 5/1998 | Turnbull | 320/2 |
| 5,747,966 | 5/1998 | Minamoto | 320/6 |

* cited by examiner

Primary Examiner—Edward H. Tso
(74) Attorney, Agent, or Firm—Paul E. Schaafsma; Francis C. Kowalik

(57) ABSTRACT

The present invention provides a cost-effective, accurate use of multiple batteries in a battery pack 110. The battery pack 110 consisting a plurality of battery cells 112. A monitoring circuit 117, 217, 317 is provided that monitors the battery cells 112. The monitoring circuit 117, 217, 317 is connected to a microprocessor 119 through an analog-to-digital converter 114. The microprocessor 119 determines the amount of voltage remaining in the battery cells 112. The microprocessor 119 also monitors the voltage output from the battery pack 110. When the voltage being supplied by the battery pack 110 falls below a threshold value, a switching circuit 121, 221, 321 switches depleted battery cells 112 with charged battery cells 112.

24 Claims, 6 Drawing Sheets

BATTERY CONTROL CIRCUIT

FIELD OF THE INVENTION

The present invention relates to a battery circuit in general and, in particular, to a battery pack circuit for use for example in a medical infusion pump.

BACKGROUND OF THE INVENTION

The use of battery power to power electronic devices is well known. Use of batteries enables electronic devices to be utilized when not connected to a stationary power source, such as the alternating current (AC) supplied in standard electrical outlets. However, the demands for power that many of these portable electronic devices can make on the power source is often significant. One such example is the use of an ambulatory pumping device for the administration of intravenous liquids to patients.

The administration of intravenous liquids to a patient is well known in the art. Typically, a solution such as saline, glucose or electrolyte contained in a flexible container is fed into a patient's venous system through a conduit such as a polyvinyl chloride (PVC) tube which is accessed to the patient by a catheter. Many times, the fluid is infused under the forces of gravity, and the rate of flow is controlled by a roller clamp which is adjusted to restrict the flow lumen of the tube until the desired flow rate is obtained.

Flow from the container to the patient also is known to be regulated by means other than a roller clamp. It is becoming more and more common to use an electronically controlled infusion pump. Such pumps include, for example, valve-type pumps. In such devices, a container or bag typically provides for the delivery of the fluid to the tube. A mechanism pinches on the tube using an occluder, and typically a pair of occluders. A plunger, pressing on the tube between the occluders provides the motive force to deliver fluid to the patient. When fluid is delivered to a patient, one of the occluders opens. Different bolus sizes are accomplished by controlling a stroke distance of the plunger. Different flow rates are accomplished by varying the frequency of the operation of the occluders and plungers open/close cycle.

Because of the demands such electronic devices place on the power source, the use of a battery pack having sufficient power can add considerable to the cost of the device. In addition, the size and weight of sufficient battery packs can detract from the portability of the device. What is thus needed is a battery pack that incorporates cost-effective, accurate use of multiple batteries.

SUMMARY OF THE INVENTION

The present invention provides a battery circuit that incorporates cost-effective, accurate use of multiple batteries in a battery pack. A battery pack is provided. The battery pack consists of a plurality of battery cells. A monitoring circuit is provided that monitors the battery cells. The monitoring circuit is connected to a microprocessor through an analog to digital converter. The microprocessor determines the amount of voltage remaining in the battery cells. The microprocessor also monitors the voltage output from the battery pack. When the voltage being supplied by the battery pack falls below a threshold value, a switching circuit switches depleted battery cells with charged battery cells.

DETAILED DESCRIPTION OF A PREFERRED EMBODIMENT

Figure 1:
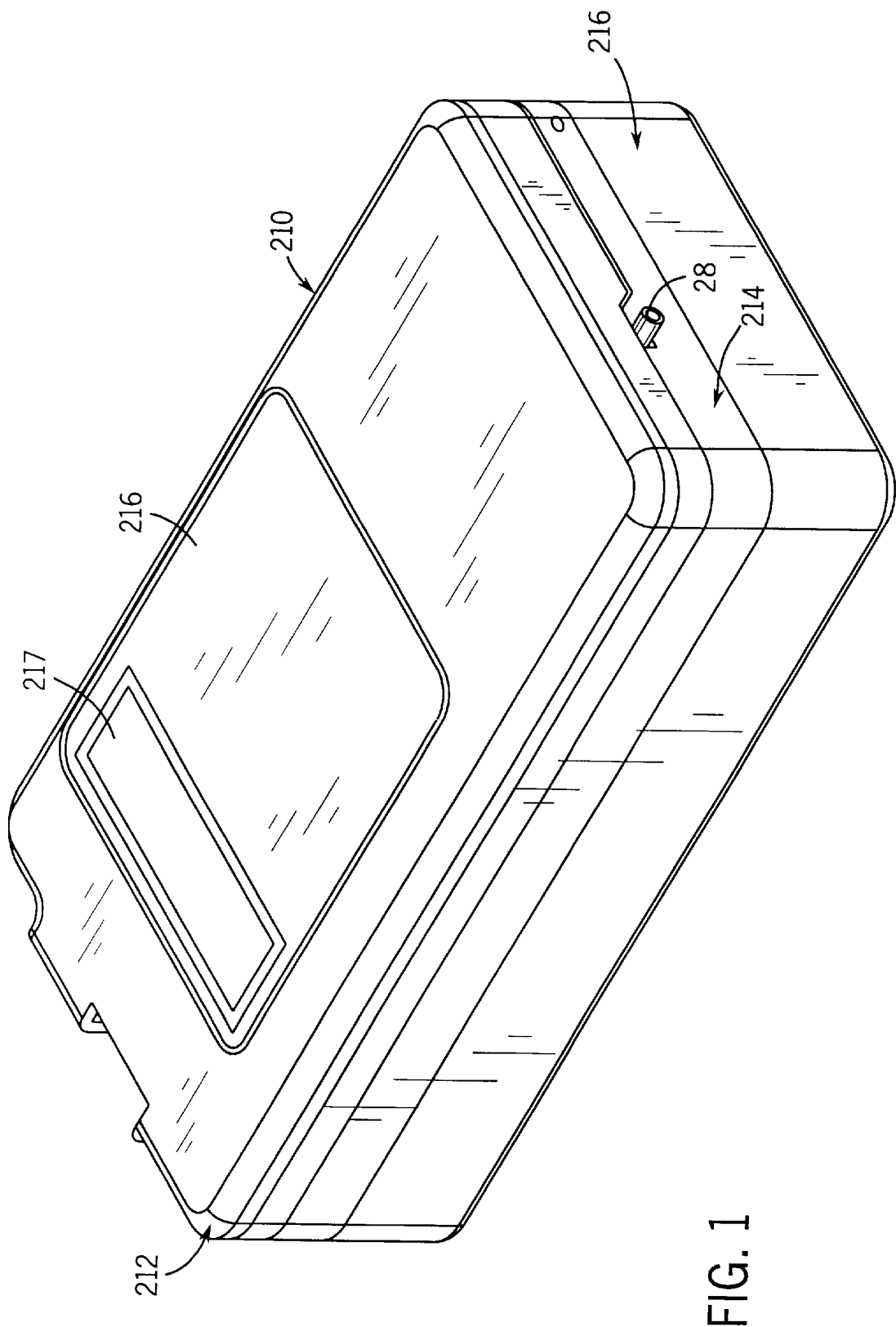
FIG. 1 is an example of an intravenous fluid infusion pump in which the present invention can be utilized.

Referring to FIG. 1, an example of a fluid delivery device in which the present invention can be utilized is referred to generally as 210. While the example described herein is an ambulatory intravenous infusion pump, the principles of the present invention can be applied to a number of different electronic devices that are powered by batteries. The pump 210 includes a main body portion 214 and at least one fluid delivery mechanism 216. The pump 210 also includes a cover 212.

Figure 2:
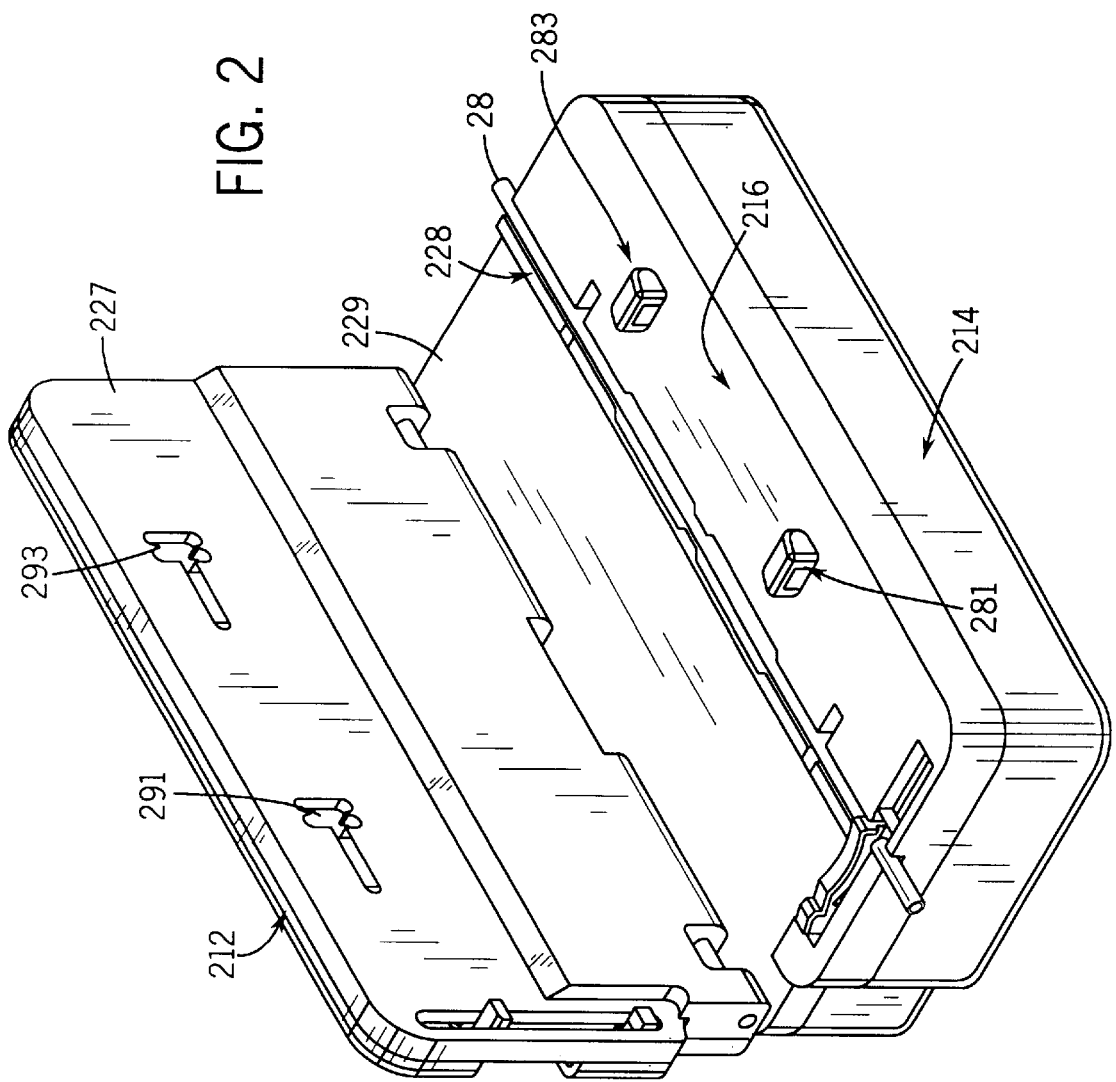
FIG. 2 is a perspective view of the intravenous fluid infusion pump of FIG. 1 in an open position.

Referring to FIG. 2, the pump 210 of FIG. 1 is seen in the open position. At least one fluid delivery mechanism 216 is located within the main body 214 of the pump 210. The fluid delivery mechanism 216 includes a tube-loading channel 228 into which a tube 28 is loaded into the pump 210. The fluid delivery mechanism 216 may further include a tube-loading feature. Associated with the fluid delivery mechanism 216 is a bottom plate 229. Associated with a cover 212 is a top plate 227. Disposed on the bottom plate 229 are receiving mechanisms 281, 283. Disposed on the top plate 227 and operatively associated with receiving mechanisms 281, 283 are latching mechanisms 291, 293.

Figure 3:
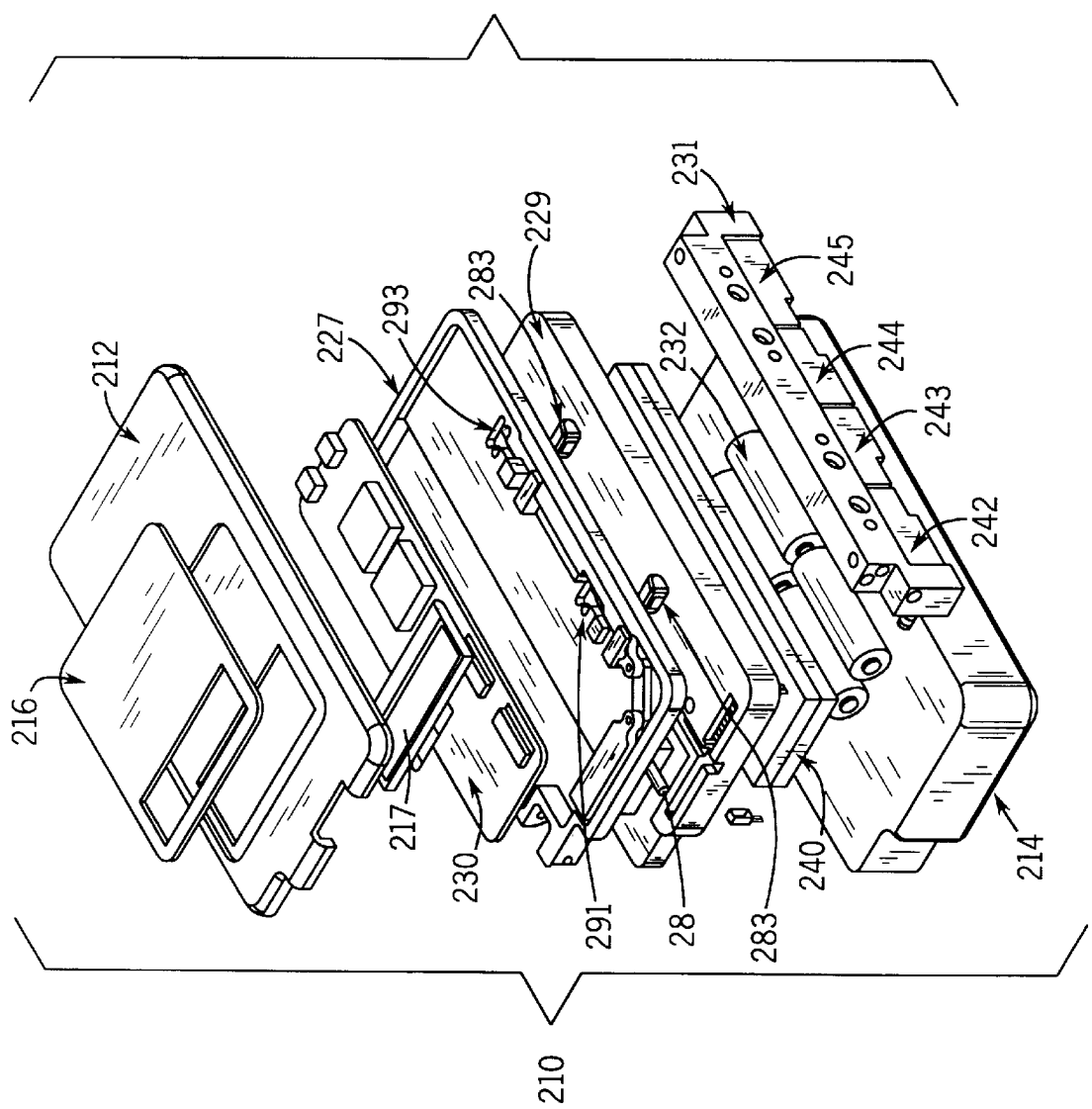
FIG. 3 is an exploded view of the intravenous fluid infusion pump of FIG. 1 illustrating components internal to the intravenous fluid infusion pump.

Referring now to FIG. 3, an exploded view of the pump 210 of FIG. 1 is depicted. The pump 210 further includes a pad 216 disposed on the cover 212, the pad 216 providing keypad access to the pump 210. A window is provided in the pad 216 for a display 217. In the preferred embodiment, the display 217 can be an LCD display. The pump 210 includes an electronic control 230 for controlling the operation of the pump 210. An occluder mechanism 240 is disposed within the pump 210, the occluder mechanism 240 providing the means to move a fluid through the tube 228, as described in detail below. A power supply 232 is also disposed in the pump 210, the power supply 232 providing a source of power to operate the pump 210. In the preferred ambulatory embodiment described herein, the power supply 232 is a series of batteries. Included in the occluder mechanism 240 are solenoid valves 242, 243, 244 and 245. The functions of the solenoid valves 242, 243, 244 and 245 are described in more detail below.

Figure 4:
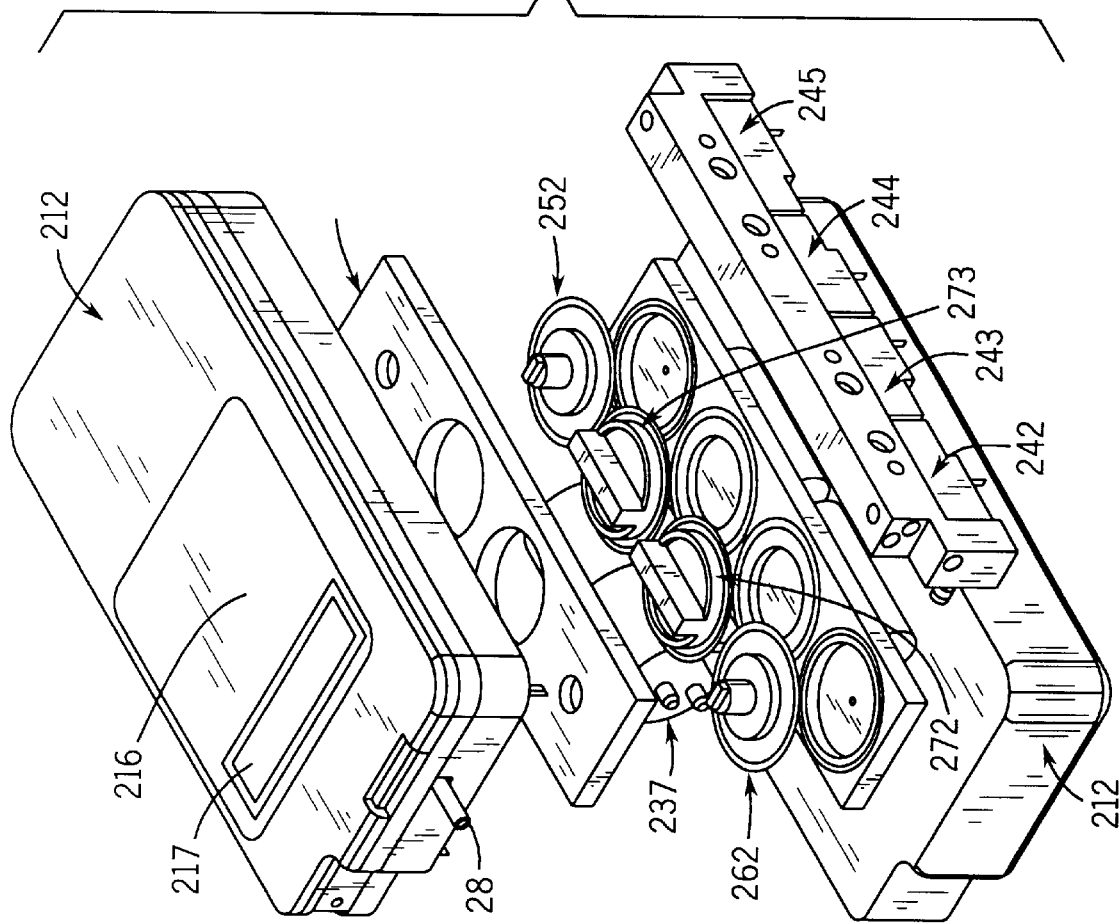
FIG. 4 is a further exploded view of the intravenous fluid infusion pump of FIG. 1 illustrating further components internal to the intravenous fluid infusion pump.

Referring to FIG. 4, an exploded view of the pump 210 illustrating components is seen 210. The pump 210 further includes occluders 252, 262 and plungers 272, 273. The function of occluders 252, 262 and plungers 272, 273 are described in further detail below.

Figure 5:
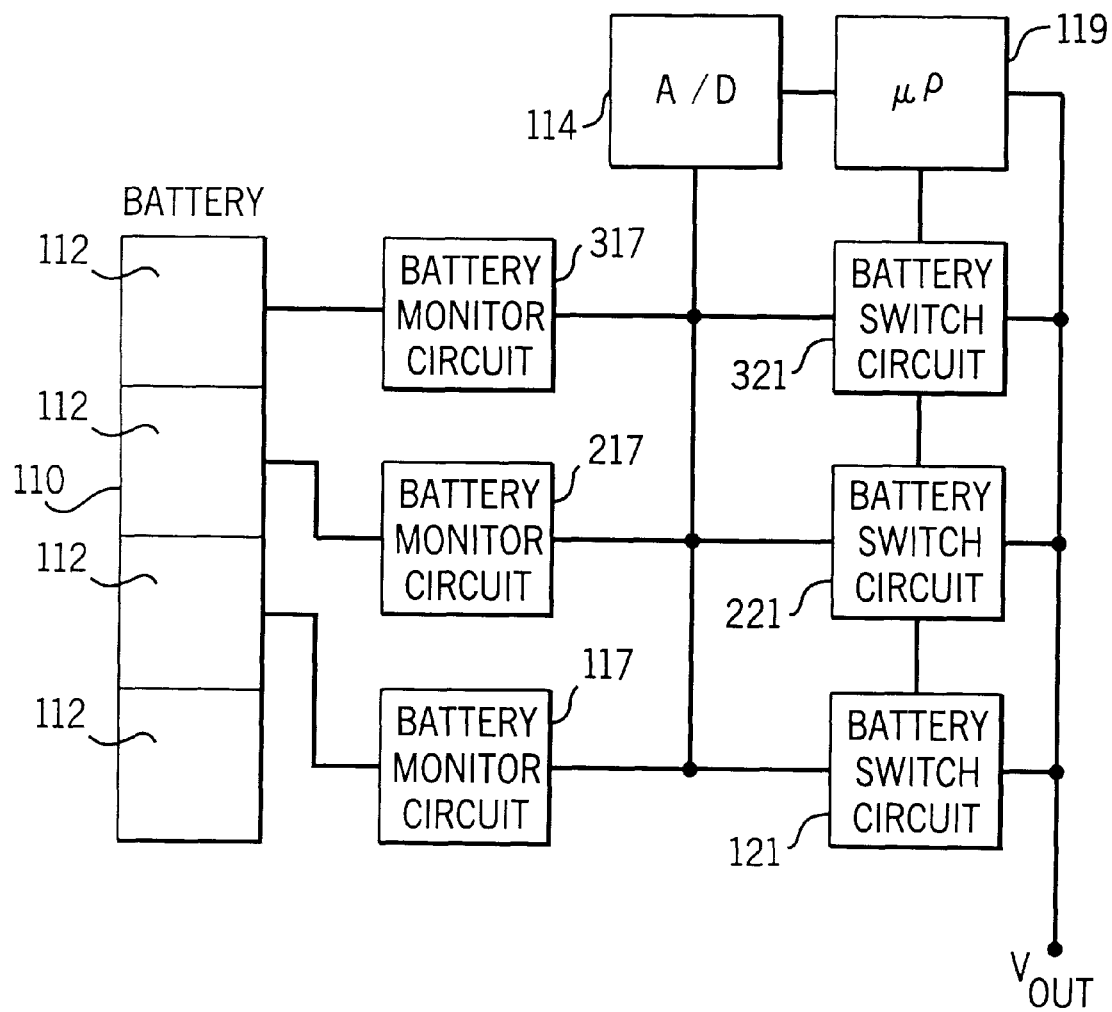
FIG. 5 is a block diagram of a battery pack circuit constructed in accordance with the principles of the present invention.
Figure 6:
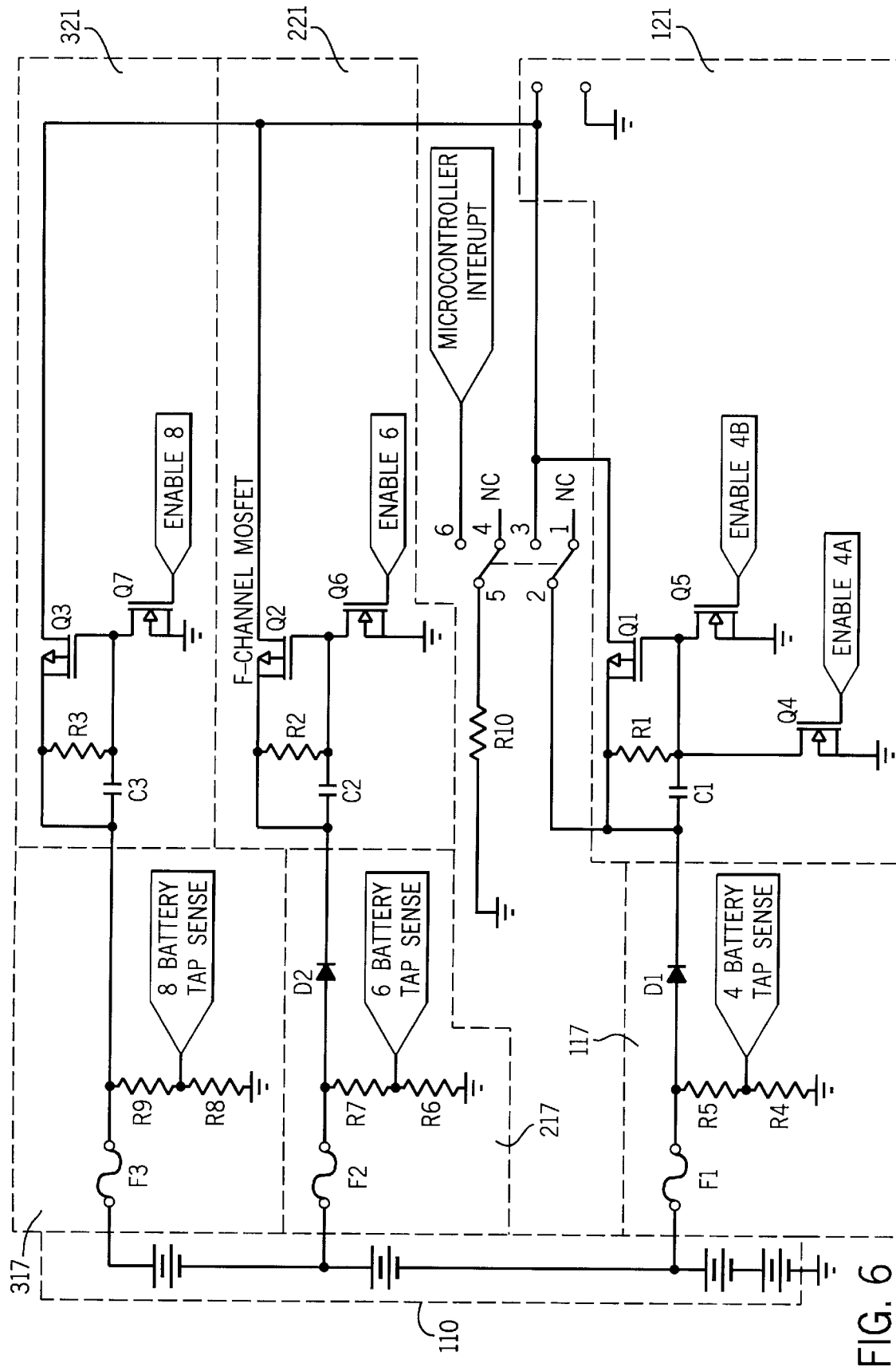
FIG. 6 is a schematic diagram of a battery pack circuit constructed in accordance with the principles of the present invention.

Referring now to FIGS. 5 and 6, a battery pack circuit constructed in accordance with the principles of the present invention is seen. FIG. 5 depicts a block diagram of a battery pack circuit, whereas, FIG. 6 depicts a schematic diagram of a battery pack circuit, both constructed in accordance with the principles of the present invention.

Referring first to FIG. 5, a circuit in accordance with the present invention includes a battery pack 110 having a plurality of battery cells 112. An analog to digital (A/D) converter 114 is connected to each battery cell 112 via a battery monitoring circuit 117, 217, 317. The A/D converter 114 supplies input to the microprocessor 119 indicating the voltage charge of each battery cell 112. A microprocessor 119 also monitors the voltage output from the battery pack 110 to the electonic device. If the voltage being supplied to the electronic device falls below a predetermined level, the microprocessor 119 switches depleted battery cells with charged battery cells via a battery switching circuit 121, 221, 321.

The battery pack consists of a plurality of battery cells connected in series used to power the electronic device. With a 4-cell battery pack, one monitoring circuit and one switching circuit 121, 221, 321 are provided; with a 6-cell battery pack, two monitoring circuits and two switching circuits are provided; with an 8-cell battery pack, three monitoring circuits and three switching circuits are provided; with a 10-cell battery pack, four monitoring circuits and four switching circuits are provided; with a 12-cell battery pack, five monitoring circuits and five switching circuits are provided, etc. Referring now to FIG. 6, in the preferred embodiment described herein, the number of battery cells 112 in the battery pack 110 is eight. With an 8-cell battery pack, three monitoring circuits 117, 217, 317 and three switching circuits 121, 221, 321 are provided. For ease of description, the third monitoring circuit 317 and the third switching circuits 321 are described in detail.

The third battery monitoring circuit is designated generally by the reference number 321. At the junction of the second set 212 of battery cell and the third set 312 of battery cells, a fuse F3 is provided. The fuse F3 acts to protect the circuit in the event of a component failure. On the end of the fuse F3 opposite the battery pack 110, a voltage divider is provided. The voltage divider consists of two series resistors R8, R9. At the junction of the two series resistors R8, R9, a battery tap sense is taken. The junction of the two sense resistors R8, R9 is connected to the A/D converter. An analog to digital conversion is performed. The A/D converter supplies input to the microprocessor of the electronic device indicating the voltage charge of each battery cell.

The third switch circuit is designated generally by the reference number 321. Also connected to the fuse F3 is the source of a field effect transistor Q3. In the preferred embodiment, this field effect transistor Q3 is a p-channel MOSFET. A resistor R3 is provided between the gate and the source of the field effect transistor Q3. The resistor R3 is used to bias the field effect transistor Q3. A capacitor C3 is connected between the resistor R3 and the fuse F3. The capacitor C3 acts to speed up the turn off time of the field effect transistor Q3.

Connected to the gate of the field effect transistor Q3 is the drain of a second field effect transistor Q7. In a preferred embodiment described herein, the field effect transistor Q7 is an n-channel MOSFET. The source of the field effect transistor Q7 is connected to ground. The gate of the field effect transistor Q7 is connected to the microprocessor.

With the 8-cell battery pack, three monitoring circuits and three switching circuits are provided. The three monitoring circuits provide for three battery tap sense locations: between the voltage divider resistors R8, R9, an eight battery tap sense is taken; between the voltage divider resistors R6, R7, a six battery tap sense is taken; and between voltage divider resistors R4, R6, a four battery tap sense is taken. The three switching circuits provide for three battery connections as described in detail below.

The first and second monitoring circuits are comparable to the third battery monitoring circuit previously described in detail, with the exception that a diode is provided between the fuses F1, F2 to block voltage. The first and second switching circuits are comparable to the third switching circuit previously described, with the addition in the first switching circuit of a third field effect transistor Q4, the drain of which is connected to the junction of the resistor R1 and the capacitor C1, the source of which is connected to ground, and the gate of which is connected to the microprocessor. Also in the first switching circuit, the field effect transmitter Q1 provides a voltage path between the battery and the voltage output Vout after the mechanical switch SW1 is turned off. This allows for a logical control check by the microprocessors.

Connected between the voltage output Vout and ground is a mechanical switch SW1. A resister R10 is provided between the mechanical switch SW1 and ground. When the circuit is initially turned on by the mechanical switch SW1, voltage is routed to the voltage output Vout. This voltage Vout turns on the microprocessor, which senses the three voltage battery tap senses. If all eight battery cells are in place and fully charged, the microprocessor will turn off the third battery cell set through the field effect transmitter Q3 by disabling the field effect transmitter Q7. Additionally, if all eight battery cells are in place and are fully charged, the microprocessor will turn off the second battery cell set sense through field effect transmitter Q2 by disabling field effect transmitter Q6. This results in a voltage of 6 volts at the output voltage Vout due to the conduction of the first battery cell set through the mechanical switch SW1 and field effect transmitter Q1 by enabling the field effect transmitters Q4 and Q5.

When the voltage at the voltage output Vout falls below a predetermined threshold, for example in a preferred embodiment 4.5 volts, the second battery cell set is turned on by the microprocessor through field effect transmitter Q2 by enabling field effect transmitter Q6 to allow field effect transmitter Q2 to conduct. This raises the voltage at the voltage output Vout to 7.5 volts, which consists of 4.5 volts from the first battery cell set plus three volts from the second battery cell set. As these battery cells are consumed, voltage will fall through the threshold, again preferably 4.5 volts, at which point the third battery cell set is turned on. The third battery tap is turned on through the field effect transmitter Q3 by enabling the field effect transmitter Q7. Additionally, the second battery cell set is turned off through field effect transmitter Q2 by disabling field effect transmitter Q6. This again results in a voltage of 7.5 volts at the voltage output Vout, which consists of 4.5 volts from the first battery cell set plus three volts from the third battery cell set.

It should be understood that various changes and modifications to the preferred embodiment described herein will be apparent to those skilled in the art. Such changes and modifications can be made without departing from the spirit and scope of the present invention and without diminishing its attendant advantages. It is therefore intended that such changes and modifications be covered by the appended claims.

What is claimed is:

1. A battery circuit, comprising:
   a battery pack for powering an electronic means, the battery pack consisting a plurality of battery cells;

monitoring circuit means for monitoring the battery cells;

means responsive to the monitoring circuit means for determining the amount of charge remaining in the battery cells;

monitoring means for monitoring the voltage output from the battery pack; and switching circuit means for switching depleted battery cells with charged battery cells if the voltage being supplied falls below a predetermined level.

2. The battery circuit of claim 1 wherein the monitoring circuit means further includes a voltage divider.

3. The battery circuit of claim 2 wherein the voltage divider further includes a pair of resistors.

4. The battery circuit of claim 1 wherein the means responsive to the monitoring circuit means for determining the amount of charge remaining in the battery cells includes an analog to digital converter.

5. The battery circuit of claim 1 wherein the means responsive to the monitoring circuit means for determining the amount of charge remaining in the battery cells includes a microprocessor.

6. The battery circuit of claim 1 wherein the means for monitoring the voltage output from the battery pack includes a microprocessor.

7. The battery circuit of claim 1 wherein the switching circuit means for switching depleted battery cells with charged battery cells if the voltage being supplied to the electronic means falls below a predetermined level includes a pair of transistors.

8. The battery circuit of claim 7 wherein the transistors are field effect transistors.

9. The battery circuit of claim 8 wherein the field effect transistors are MOSFETs.

10. The battery circuit of claim 1 wherein the electronic means is a pump.

11. The battery circuit of claim 10 wherein the pump is an ambulatory infusion pump.

12. A battery circuit for use with a battery powered device, comprising:

a battery pack for powering the electronic device, the battery pack consisting a plurality of battery cells;

a monitoring circuit that monitors the battery cells;

a microprocessor connected to the monitoring circuit, the microprocessor determining the amount of charge remaining in the battery;

the microprocessor further monitoring the voltage output from the battery pack; and a switching circuit that switches depleted battery cells with charged battery cells if the voltage being supplied falls below a predetermined level.

13. The battery circuit of claim 12 wherein the monitoring circuit further includes a voltage divider.

14. The battery circuit of claim 13 wherein the voltage divider further includes a pair of resistors.

15. The battery circuit of claim 12 further wherein an analog to digital converter in connected between the monitoring circuit and the microprocessor.

16. The battery circuit of claim 12 wherein the switching circuit includes a pair of transistors.

17. The battery circuit of claim 16 wherein the transistors are field effect transistors.

18. The battery circuit of claim 17 wherein the field effect transistors are MOSFETs.

19. The battery circuit of claim 12 wherein the electronic device is a pump.

20. The battery circuit of claim 19 wherein the pump is an ambulatory infusion pump.

21. A method of supplying electrical power, comprising:

providing a battery pack consisting a plurality of battery cells;

monitoring the battery cells;

determining the amount of charge remaining in the battery cell;

monitoring the voltage output from the battery pack; and switching depleted battery cells with charged battery cells if the voltage being supplied falls below a predetermined level.

22. The method of claim 21 wherein the step of determining the amount of charge remaining in the battery cell further includes converting analog signals to digital signals.

23. The method of claim 21 wherein the step of determining the amount of charge remaining in the battery cell further includes determining the voltage of the battery cell.

24. The method of claim 21 wherein the step of determining the amount of charge remaining in the battery pack further includes determining the voltage of the battery pack.

* * * * *